(12) United States Patent
Turek et al.

(10) Patent No.: US 6,774,178 B2
(45) Date of Patent: Aug. 10, 2004

(54) TINTED, HIGH DK OPHTHALMIC MOLDING AND A METHOD FOR MAKING SAME

(75) Inventors: Richard Charles Turek, Atlanta, GA (US); Jacalyn Mary Schremmer, Atlanta, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 10/017,549

(22) Filed: Dec. 14, 2001

(65) Prior Publication Data

US 2002/0137811 A1 Sep. 26, 2002

Related U.S. Application Data

(60) Provisional application No. 60/259,957, filed on Jan. 5, 2001.

(51) Int. Cl.$^7$ .............................................. C08L 83/07
(52) U.S. Cl. ........................ 524/858; 528/32; 528/33; 540/139; 540/140; 523/106; 523/107; 524/588; 524/544; 524/700; 526/279; 8/507; 264/299; 264/1.32
(58) Field of Search ................. 528/32, 33; 351/159; 523/106; 524/588, 544, 858, 700; 8/507; 264/299, 1.32; 526/279; 540/139, 140

(56) References Cited

U.S. PATENT DOCUMENTS

| | | | |
|---|---|---|---|
| 4,252,421 A | * | 2/1981 | Foley, Jr. |
| 4,423,195 A | * | 12/1983 | Covington |
| 4,486,577 A | * | 12/1984 | Mueller et al. |
| 4,769,431 A | | 9/1988 | Ratkowski ................... 526/279 |
| 5,106,533 A | | 4/1992 | Hendrickson et al. ...... 252/314 |
| 5,292,350 A | * | 3/1994 | Molock et al. |
| 5,451,303 A | * | 9/1995 | Heiler et al. ................. 205/769 |
| 5,508,317 A | | 4/1996 | Muller ......................... 522/85 |
| 5,760,100 A | | 6/1998 | Nicolson et al. ............ 523/106 |
| 5,871,675 A | | 2/1999 | Muller et al. ............... 264/1.38 |
| 6,149,842 A | | 11/2000 | Lally et al. ................. 264/1.36 |
| 6,193,369 B1 | * | 2/2001 | Valint et al. ............ 351/160 H |

FOREIGN PATENT DOCUMENTS

| | | |
|---|---|---|
| EP | 0 093 944 | 8/1986 |
| EP | 0 578 087 A2 | 1/1994 |
| EP | 0 584 826 A2 | 3/1994 |
| EP | 0 343 796 B1 | 3/1996 |
| GB | 2 039 932 A | 8/1980 |
| WO | WO 94/03324 | 2/1994 |
| WO | WO 98/05690 | 2/1998 |
| WO | WO 99/02574 | 1/1999 |
| WO | WO 99/26087 | 5/1999 |

OTHER PUBLICATIONS

Grolier, "The Encyclopedia Americana International Edition", Grolier Incorp., vol. 7, 1998, pp. 685–686.*
International Search Report PCT/EP 02/00020.

* cited by examiner

*Primary Examiner*—Kuo-Liang Peng
(74) *Attorney, Agent, or Firm*—Jian S. Zhou; Robert Gorman; R. Scott Meece

(57) ABSTRACT

The invention relates to ophthalmic molding formulations and to tinted, high Dk ophthalmic moldings. This invention also relates to a method for making a tinted ophthalmic molding. The method comprises: (a) providing a polymer precursor having cross-linkable or polymerizable groups; (b) providing a pigment dispersion comprising an inorganic or organic pigment and a dispersing agent; (c) mixing the pigment dispersion with the polymer precursor to form a tinted prepolymer mixture; (d) dispensing the tinted prepolymer mixture into a mold; and (e) forming a tinted ophthalmic molding from the tinted prepolymer mixture, the molding comprising a polymer matrix having the pigment entrapped therein. With this method, tinted ophthalmic moldings, particularly edge-to-edge soft, tinted contact lenses having improved properties, are prepared with an improved efficiency.

30 Claims, No Drawings

TINTED, HIGH DK OPHTHALMIC MOLDING AND A METHOD FOR MAKING SAME

This application claims the benefit under 35 U.S.C. §119(e) of U.S. provisional application No. 60/259,957 filed Jan. 5, 2001.

FIELD OF THE INVENTION

This invention relates broadly to optic and ophthalmic arts. More particularly, this invention relates to tinted polymeric materials, tinted ophthalmic moldings and methods useful in making tinted ophthalmic moldings. Still more particularly, this invention relates to compositions and methods for making high Dk, visibility ("full body" or "edge-to-edge") tinted contact lenses.

BACKGROUND OF THE INVENTION

1. High Dk Ophthalmic Moldings

In the field of ophthalmic moldings, and in particular in the field of contact lenses, a biocompatible lens may be generally defined as one which will not substantially damage the surrounding ocular tissue and ocular fluid during the time period of contact. The phrase "ophthalmically compatible" more appropriately describes the biocompatibility requirements of ophthalmic lenses.

One ophthalmic compatibility requirement for contact lenses is that the lens must allow oxygen to reach the cornea in an amount which is sufficient for long-term corneal health. The contact lens must allow oxygen from the surrounding air to reach the cornea because the cornea does not receive oxygen from the blood supply like other tissue. If sufficient oxygen does not reach the cornea, corneal swelling occurs. Extended periods of oxygen deprivation causes the undesirable growth of blood vessels in the cornea. "Soft" contact lenses conform closely to the shape of the eye, so oxygen cannot easily circumvent the lens. Thus, soft contact lenses must allow oxygen to diffuse through the lens to reach the cornea.

While there exist rigid gas permeable ("RGP") contact lenses which have high oxygen permeability and which move on the eye, RGP lenses are typically quite uncomfortable for the consumer. Thus, soft contact lenses are preferred by many consumers because of comfort. Moreover, a contact lens which may be continuously worn for a period of a day or more (including wear during periods of sleeping) requires comfort levels which exclude RGP lenses as popular extended-wear candidates.

In order to balance the ophthalmic compatibility and consumer comfort requirements in designing a daily wear soft contact lens, polymers and copolymers of 2-hydroxyethyl methacrylate (HEMA) were developed. These hydrophilic polymers move well on the eye and provide sufficient oxygen permeability for daily wear. Certain soft contact lenses have been approved by the FDA for extended wear periods of up to about 6 nights of overnight wear and seven days of daily wear. However, the consumer cannot safely and comfortably wear these poly(HEMA) lenses for extended periods of seven days or more, because the oxygen permeability is insufficient. True extended wear (i.e., seven days or more) of these lenses may result, at a minimum, in corneal swelling and development of surface blood vessels in the cornea.

In order to improve oxygen permeability, polymers containing silicone groups were developed. A variety of siloxane-containing polymers have been disclosed as having high oxygen permeability (high Dk). For example, see U.S. Pat. Nos. 3,228,741; 3,341,490; 3,996,187; and 3,996,189.

2. Tinted Ophthalmic Moldings

A number of dyes have been incorporated into ophthalmic moldings, such as contact lenses, for a variety of reasons. Two popular type of dyes include ultraviolet (UV) light absorbing agents. One common reason for incorporating dyes into contact lenses is to produce a lens that changes the apparent perceived color of the wearer's iris. Another reason to dye a lens is to enable the user to easily locate a lens in a clear solution within a lens storage, disinfecting or cleaning container. Dyeing a lens for this purpose is for "visibility tinting" the lens.

Visibility tinting may be accomplished by applying a dye to a portion of the surface or by applying the dye to the full front surface of the lens. Alternatively, the tint may be incorporated into the full body of the polymer matrix of the lens. There have been a number of patents and published patent applications relating to tinting contact lenses or making contact lenses that change the wearer's iris color. However, these processes are not yet totally satisfactory, for example, with respect to the types of lens materials used to tint, the production efficiency, and/or the quality of the products obtained.

Thus, there remains a need for an ophthalmically compatible, visibility tinted transparent polymeric lens material which is suited to short and extended periods of continuous contact with ocular tissue and tear fluid. In addition, there is still a need for a method of making an improved visibility tinted, i.e., a full body, edge-to-edge tinted contact lens with an improved efficiency by minimizing in-line production steps. Also, there remains a need for a method for tinting or coloring a lens that does not require the use of reactive dyes and associated wet processing necessary to remove unbound dye, activator and reaction by-products.

Moreover, there is a need for tinted ophthalmic lenses with improved properties, for example, with respect to high oxygen permeability, increased mechanical strength, reduced leaching or migration of dye or pigment out of the lens material, and color retention during exposure to UV light during photopolymerization.

SUMMARY OF THE INVENTION

In accordance with the purpose of this invention, as embodied and broadly described herein, this invention, in one aspect relates to a soft, tinted ophthalmic molding comprising a polymer matrix having a high oxygen permeability and incorporated therein a pigment.

In another aspect, this invention relates to a soft, tinted ophthalmic lens comprising the reaction product of (i) a cross-linkable or polymerizable material capable of forming a polymer or copolymer having a high oxygen permeability; and (ii) a pigment dispersion comprising a pigment and a dispersing agent.

In yet another aspect, this invention relates to a composition for making a soft, tinted ophthalmic lens comprising (i) a cross-linkable or polymerizable material capable of forming a polymer or copolymer having a high oxygen permeability; and (ii) a pigment dispersion comprising a pigment and a dispersing agent.

In another aspect, this invention relates to a method for making a soft, tinted ophthalmic molding comprising: (a) providing a polymer precursor capable of forming a polymer or copolymer having high oxygen permeability; (b) providing a pigment dispersion comprising a pigment and a dispersing agent; (c) mixing the pigment dispersion and the polymer precursor to form a tinted prepolymer mixture; (d)

dispensing the tinted prepolymer mixture into a mold; and (e) cross-linking or polymerizing the tinted prepolymer mixture in the mold to form a soft, tinted ophthalmic molding having high oxygen permeability comprising a polymer matrix and the pigment entrapped therein.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific methods and conditions and parameters described, as specific methods and/or method conditions and parameters for processing polymers and polymer formulations as such may, of course, vary. It is also understood that the terminology used herein is used for the purpose of describing particular embodiments only and is not intended to be limiting. It must also be noted that, as used in the specification including the appended claims, the singular forms "a," "an," and "the" include plural references unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

One embodiment of the present invention is a method of tinting an ophthalmic molding or lens comprising mixing a miscible, liquid pigment dispersion or colorant with a liquid, polymerizable lens material or formulation.

Another embodiment of this invention relates to a soft, tinted ophthalmically compatible, transparent lens suited for continuous contact with ocular tissue and tear fluids. A particularly preferred embodiment of the invention is a soft, tinted vision correction lens suited for safe and comfortable wear. In order to properly describe the invention and to delineate the metes and bounds of the claims, a set of basic terms will be defined at the outset.

I. Definition of Terms

An "ophthalmic molding", as used herein, refers to moldings or lenses which are placed in intimate contact with the eye or tear fluid, such as contact lenses for vision correction (e.g., spherical, toric, bifocal), contact lenses for modification of eye color, ophthalmic drug delivery devices, ocular tissue protective devices (e.g., ophthalmic healing promoting lenses), and the like. A particularly preferred ophthalmic molding is a tinted contact lens, especially a contact lens for vision correction.

A "polymer precursor" and "prepolymer," as used herein, refer to a cross-linkable or polymerizable material. Preferably, the polymer precursor is hydrophobic and more preferably is a silicone-containing macromer or monomer.

A "polymerizable material which is capable of polymerizing to form a polymer having a high oxygen permeability," as used herein, refers to monomers, oligomers, macromers, and the like, and mixtures thereof, which are capable of polymerizing with like or unlike polymerizable materials to form a polymer which displays a relatively high rate of oxygen diffusion therethrough. For convenience of reference, these materials will be referred to herein as "oxyperm polymerizable materials" and the resultant polymers will be referred to herein as "oxyperm polymers".

The "oxygen transmissibility" of a lens, as used herein, is the rate at which oxygen will pass through an ophthalmic lens. Oxygen transmissibility, Dk/t, is conventionally expressed in units of barrers/mm, where t is the average thickness of the material [in units of mm] over the area being measured and "barrer" is defined as:

$$((cm^3\ oxygen)(mm)/(cm^2)(sec)(mm\ Hg)) \times 10^{-9}$$

The "oxygen permeability", Dk, of a lens material does not depend on lens thickness. Oxygen permeability is the rate at which oxygen will pass through a material. Oxygen permeability is conventionally expressed in units of barrers, where "barrer" is defined as:

$$((cm^3\ oxygen)(mm)/(cm^2)(sec)(mm\ Hg)) \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm ("oxygen transmissibility barrers"/mm).

A "polymerizable material which is capable of polymerizing to form a polymer having a high ion permeability" as used herein, refers to monomers, oligomers, macromers, and the like, and/or mixtures thereof, which are capable of polymerizing with like or unlike polymerizable materials to form a polymer which displays a relatively high rate of ion or water permeation therethrough. For convenience of reference, these materials will be referred to herein as "ionoperm polymerizable materials" and the resultant polymers will be referred to herein as "ionoperm polymers".

A "macromer", as used herein, refers to a polymerizable material which has a molecular weight of at least about 800 grams/mol. The term "macromer", as used herein, also encompasses oligomers.

A "monomer", as used herein, refers to a polymerizable material which has a molecular weight of less than about 800 grams/mol.

"Pigment(s), as used herein, shall mean any substance that imparts color to another material or mixture. Pigment is sometimes used synonymously with "colorant." Pigments are usually dry powders and may be inorganic or organic.

"Dispersion or dispersed," as used herein, refers to a variety of levels or degrees of separation of pigment particles in a dispersing agent.

"Ophthalmically compatible", as used herein, refers to a material or surface of a material which may be in intimate contact with the ocular environment for an extended period of time without significantly damaging the ocular environment and without significant user discomfort. Thus, an ophthalmically compatible contact lens will not produce significant corneal swelling, will adequately move on the eye with blinking to promote adequate tear exchange, will not have substantial amounts of lipid adsorption, and will not cause substantial wearer discomfort during the prescribed period of wear.

"Ocular environment", as used herein, refers to ocular fluids (e.g., tear fluid) and ocular tissue (e.g., the cornea) which may come into intimate contact with a contact lens used for vision correction, drug delivery, wound healing, eye color modification, or other ophthalmic applications.

The "outer surface" of a lens, as used herein, refers to the surface of the lens which faces away from the eye during wear. The outer surface, which is typically substantially convex, may also be referred to as the front curve of the lens. The "inner surface" of a lens, as used herein, refers to the surface of the lens which faces towards the eye during wear. The inner surface, which is typically substantially concave, may also be referred to as the base curve of the lens.

"TRIS", as used herein, refers to 3-methacryloxypropyltris(trimethylsiloxy) silane. The term "TRIS" also includes dimers, trimers, and the like of 3-methacryloxypropyltris(trimethylsiloxy) silane.

"Molecular weight" of a polymeric material (including monomeric or macromeric materials), as used herein, refers to the number-average molecular weight unless otherwise specifically noted or unless testing conditions indicate otherwise.

II. Polymer Precursor and Polymeric Materials

In a preferred embodiment, the polymer precursor is a prepolymer, e.g., macromer, having a number average molecular weight of at least about 300. The prepolymer has more preferably a number average molecular weight of about 300 to about 30,000, and even more preferably from about 500 to about 20,000. Most preferred, the prepolymer has a number average molecular weight of about 1,000 to about 10,000.

The prepolymer used with this invention includes polymerizable or cross-linkable groups. "Cross-linkable groups" denotes customary cross-linkable groups well known to a person skilled in the art, such as for example, photo cross-linkable or thermally cross-linkable groups. Cross-linkable groups such as those already proposed for contact lens materials are suitable. Those include, but are not limited to groups comprising carbon-carbon double bonds. To demonstrate the large variety of suitable cross-linkable groups, there are mentioned here, merely by way of example, the following cross-linking mechanisms: radical polymerization, 2+2 cyclo addition, Diels Alder reaction, ROMP (ring opening metathesis polymerization), vulcanization, cationic cross-linking and epoxy hardening.

The polymerizable or cross-linkable materials useful with the present invention include a wide variety of materials known in the art. Preferred polymeric materials are those which are transparent and can be used in biocompatible, especially ophthalmically compatible applications.

A particularly preferred class of prepolymer and polymeric materials useful for this invention are those disclosed in U.S. Pat. No. 5,760,100, issued to Nicolson et al., the entirety of which is hereby incorporated by reference.

A. Oxyperm Polymerizable Materials

Oxyperm polymerizable materials include a wide range of materials which may be polymerized to form a polymer displaying a relatively high oxygen diffusion rate therethrough. In addition, these materials must be relatively ophthalmically compatible. These oxyperm polymerizable materials include, without limitation thereto, siloxane-containing macromers and monomers, fluorine-containing macromers and monomers, and carbon-carbon triple bond-containing macromers and monomers. The oxyperm macromer or monomer may also contain hydrophilic groups.

Preferred oxyperm polymers are those formed from a siloxane-containing macromer. Macromers having dialkyl siloxane groups, especially dimethyl siloxanes, are particularly preferred. These macromers are broadly referred to as poly(dimethyl siloxanes) (also, PDMS). The siloxane-containing macromer may also include hydrophilic groups. Examples of suitable siloxane-containing macromers include, without limitation thereto, those disclosed and described in U.S. Pat. No. 5,760,100 issued to Nicolson et al., which is herein incorporated by reference in its entirety.

The oxygen transmissibility (Dk/t) of the lens is preferably at least 60 barrers/mm, more preferably at least 65 barrers/mm, and most preferably at least 70–80 barrers/mm. The lens center thickness is typically more than about 30 microns, preferably about 30 to about 200 microns, more preferably about 40 to about 150 microns, even more preferably about 50 to about 120 microns, and most preferably about 60 to about 100 microns.

The oxygen transmissibility of an extended-wear lens, for example, from the outer surface to the inner surface must be sufficient to prevent any substantial corneal swelling during the period of extended wear. It is known that the cornea swells approximately 3% to 4% during overnight periods of sleep when the eyelids are closed, as a result of oxygen deprivation. It is also known that wearing a typical contact lens, such as ACUVUE (Johnson & Johnson), for a period of about 8 hours (overnight wear) causes corneal swelling of about 11%. However, a preferred extended-wear contact lens will produce, after wear of about 24 hours, including normal sleep periods, corneal swelling of less than about 8%, more preferably less than about 6%, and most preferably less than about 4%. A preferred extended-wear contact lens will produce, after wear of about 7 days, including normal sleep periods, corneal swelling of less than about 10%, more preferably less than about 7%, and most preferably less than about 5%. Thus, the extended-wear lens must have oxyperm polymer in an amount sufficient to produce oxygen diffusion pathways from the outer surface to the inner surface of the lens which are sufficient to yield the above properties relating to corneal swelling.

Preferably, the extended-wear lens has a continuous phase of oxyperm polymer extending from the outer surface to the inner surface of the lens.

B. Ionoperm Polymerizable Materials

Ionoperm polymerizable materials include a wide range of materials which may be polymerized to form a polymer displaying a relatively high ion diffusion rate therethrough. In addition, these materials must be relatively ophthalmically compatible. These ionoperm polymerizable materials include, without limitation thereto, acrylates and methacrylates, such as 2-hydroxyethyl methacrylate, acrylamide, methacrylamide, and dimethylacrylamide; poly(alkylene glycols), such as poly(ethylene glycol); N-vinyl pyrrolidones such as N-vinyl-2-pyrrolidone; and the like and mixtures thereof. Other ionoperm materials include, without limitation, those disclosed and described in U.S. Pat. No. 5,760,100 issued to Nicolson et al., which is incorporated herein by reference in its entirety.

C. Weight Ratios

The ratios of oxyperm to ionoperm polymerizable materials may vary substantially, depending on the selected balance of oxygen permeability and ion permeability for the chosen end-use of the molded polymeric article. Preferably, the volumetric ratio of oxyperm to ionoperm material (including water) in the fully hydrated lens is about 40 to about 60 to about 60 to about 40. However, weight percentages, based on the total weight of the lens, will be defined because weight percentages are more conveniently utilized in lens fabrication. Preferably, the extended-wear contact lenses having substantially only ionoperm and oxyperm materials will have about 60 to about 85 weight percent oxyperm polymerizable material and about 15 to about 40 weight percent ionoperm polymerizable material in the prepolymerization mixture, based on total polymerizable material weight. More preferably, the prepolymerization mixture will contain about 70 to about 82 weight percent oxyperm polymerizable material and about 18 to about 30 weight percent ionoperm polymerizable material, based on total polymerizable material weight.

A wide variety of additional polymerizable materials may be included in the mixture prior to polymerization. Cross-linking agents, such as ethylene glycol dimethacrylate (EGDMA), may be added to improve structural integrity and mechanical strength. Antimicrobial polymerizable materials such as poly(quatemary ammonium) salts may be added to inhibit microbial growth on the lens material. Also, additional ionoperm monomers or macromers and/or oxyperm polymerizable materials may be added to adjust the oxygen permeability and ion permeability of the final molded article.

An especially advantageous polymerizable material is TRIS, which may act both to increase oxygen permeability and to improve the modulus of elasticity.

A preferred prepolymerization mixture will include (a) about 20 to 60 weight percent oxyperm macromer, (b) about 20 to 40 weight percent ionoperm polymerizable material, and (c) about 1 to 35 weight percent TRIS, based on the total lens weight. More preferably, the amount of TRIS is about 10 to 33 weight percent, based on the total prepolymerization mixture weight.

In a preferred embodiment, the prepolymerization mixture includes less than about 5 weight percent cross-linking agent, based on the total prepolymerization mixture weight. More preferably, the prepolymerization mixture includes less than about 2 weight percent cross-linking agent, based on the total prepolymerization mixture weight. Even more preferably, the prepolymerization mixture includes substantially no cross-linking agent.

The previously described ranges for oxyperm polymerizable materials, ionoperm polymerizable materials, and TRIS are offered to enable the reader to better comprehend the invention. However, it should be noted that the specific weight or volume percentages of oxyperm and ionoperm polymerizable materials are not the most critical factors to consider in preparing a good ophthalmic lens. More importantly, the lens must have sufficient ion permeability for good on-eye movement and sufficient oxygen permeability for good corneal health during an extended wear period.

D. Oxygen Transmissibility and Permeability

As mentioned earlier, the cornea receives oxygen primarily from the corneal surface which is exposed to the environment, in contrast to other tissues which receive oxygen from blood flow. Thus, an ophthalmic lens which may be worn on the eye for extended periods of time must allow sufficient oxygen to permeate through the lens to the cornea to sustain corneal health. One result of the cornea receiving an inadequate amount of oxygen is that the cornea will swell. In a preferred embodiment, the oxygen transmissibility of the present ophthalmic lenses is sufficient to prevent any clinically significant amount of corneal swelling from occurring.

A preferred ophthalmic lens material will have an oxygen transmissibility, Dk/t, of at least 60 (cm$^3$ oxygen)(mm)/mm-cm$^2$×(sec/mm Hg)×10$^{-9}$ or [barrers/mm], more preferably at least 65 barrers/mm, and most preferably at least 70–80 barrers/mm. The oxygen permeability of a lens and oxygen transmissibility of a lens material may be determined by the following technique. Oxygen fluxes (J) are measured at 34EC in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The oxygen permeability of the lens material, $D_k$, is determined from the following formula:

$$D_k = Jt/(P_{oxygen})$$

where J=oxygen flux [microliters O$_2$/cm$^2$-minute]

$P_{oxygen}$=($P_{measured}$−$P_{water}$ vapor)=(% O$_2$ in air stream) [mm Hg]=partial pressure of oxygen in the air stream $P_{measured}$=barometric pressure (mm Hg)

$P_{water}$ vapor=0 mm Hg at 34 C (in a dry cell) (mm Hg)

$P_{water}$ vapor=40 mm Hg at 34 C (in a wet cell) (mm Hg)

t=average thickness of the lens over the exposed test area (mm)

where $D_k$ is expressed in units of barrers, i.e., ((cc oxygen)(mm)/cm$^2$)××(sec/mm Hg)××10–10.

The oxygen transmissibility ($D_k$/t) of the material may be calculated by dividing the oxygen permeability ($D_k$) by the average thickness (t) of the lens.

E. Examples of Suitable Polymeric Lens Materials

Examples of suitable polymeric lens materials include, without limitation thereto, those disclosed and described in U.S. Pat. No. 5,760,100 issued to Nicolson et al., U.S. Pat. No. 4,136,250 issued to Mueller et al., U.S. Pat. No. 4,153,641 issued to Deichert et al., U.S. Pat. No. 4,605,712 issued to Mueller et al., U.S. Pat. No. 4,711,943 issued to Harvey, III, U.S. Pat. No. 5,158,717 issued to Lai, U.S. Pat. No. 5,260,000 issued to Nandu et al., and U.S. Pat. No. 5,346,946 issued to Yokayama et al., which are all herein incorporated by reference in their entireties.

Preferably, the polymer matrix comprises a polysiloxane, fluorosiloxano, fluorine-containing monomer, hydrophilic monomer, hydrophobic monomer, or a copolymer thereof, or a mixture thereof.

Preferably, the lens material or formulation comprises at least one macromer, TRIS, DMA, ethanol and a photoinitiator. More preferably, the lens formulation comprises 25.92%, by weight of the formulation, of macromer, 28.88% by weight of the formulation, of DMA, 19.25% by weight of the formulation, of TRIS, 24.95% by weight of the formulation, of ethanol, and 1.00% by weight of the formulation, of a photointiator (DAROCUR, for example).

III. Comonomers

The present invention further relates to a polymer matrix comprising a polymerization product of at least one polymer precursor or macromer according to the invention as defined above and, if appropriate, at least one vinylic comonomer (a).

The preferred composition of a polymer according to the invention comprises a weight content, with respect to the total polymer, of a macromer according to the invention in the range from 100 to 0.5%, in particular in the range from 80 to 10%, and preferably in the range from 70 to 30%.

In a preferred embodiment, a polymerization product comprises at least one macromer according to the invention, a comonomer is absent, and the polymer is preferably a homopolymer.

A comonomer (a), which is contained in a polymer according to the invention, can be hydrophilic or hydrophobic or a mixture of both. Suitable comonomers include, in particular, those which are usually used for the preparation of contact lenses and biomedical materials. A hydrophobic comonomer (a) is understood as meaning monomers which typically give, as a homopolymer, polymers which are water-insoluble and can absorb less than 10% by weight of water.

Analogously, a hydrophilic comonomer (a) is understood as meaning a monomer which typically gives, as a homopolymer, a polymer which is water-soluble or can absorb at least 10% by weight of water.

Suitable hydrophobic comonomers (a) include, but are not limited to $C_1$–$C_{18}$ alkyl and $C_3$–$C_{18}$ cycloalkyl acrylates and methacrylates, $C_3$–$C_{18}$ alkylacrylamides and -methacrylamides, acrylonitrile, methacrylonitrile, vinyl $C_1$–$C_{18}$ alkanoates, $C_2$–$C_{18}$ alkenes, $C_2$–$C_{18}$ haloalkenes, styrene, lower alkyl styrene, lower alkyl vinyl ethers, $C_2$–$C_{10}$ perfluoroalkyl acrylates and methacrylates or correspondingly partly fluorinated acrylates and methacrylates, $C_3$–$C_{12}$ perfluoroalkyl-ethyl-thiocarbonylaminoethyl acrylates and methacrylates, acryloxy- and methacryloxy-alkylsiloxanes, -vinylcarbazole and $C_1$–$C_{12}$ alkyl esters of maleic acid, fumaric acid, itaconic acid, mesaconic acid and the like. Preferred comonomers are, for example, acrylonitrile, $C_1$–$C_4$ alkyl esters of vinylically unsaturated carboxylic acids having 3 to 5 carbon atoms, or vinyl esters of carboxylic acids having up to 5 carbon atoms.

Examples of suitable hydrophobic comonomers (a) include, but are not limited to methyl acrylate, ethyl acrylate, propyl acrylate, isopropyl acrylate, isobutyl acrylate (IBA), isooctyl acrylate (OA), isodecyl acrylate (DA), cyclohexyl acrylate, 2-ethylhexyl acrylate (EHA), methyl methacrylate, ethyl methacrylate, propyl methacrylate, butyl acrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl (meth) acrylate (HFBMA and HFBA), TRIS, 3-methacryloxypropylpentamethyldisiloxane and bis (methacryloxyalkyl) tetramethyldisiloxane. Preferred examples of hydrophobic comonomers (a) are methyl methacrylate, IBA, HFBA, HFBMA, OA, EHA, DA, TRIS and acrylonitrile.

Suitable hydrophilic comonomers (a) include, but are not limited to hydroxyl-substituted lower alkyl acrylates and methacrylates, acrylamide, methacrylamide, lower alkylacrylamides and -methacrylamides, ethoxylated acrylates and methacrylates, hydroxyl-substituted lower alkylacrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, -vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino-lower alkyl (where the term "amino" also includes quaternary ammonium), mono-lower alkylamino-lower alkyl and di-lower alkylamino-lower alkyl acrylates and methacrylates, allyl alcohol and the like. Preferred comonomers are, for example, N-vinyl-2-pyrrolidone, acrylamide, methacrylamide, hydroxyl-substituted lower alkyl acrylates and methacrylates, hydroxyl-substituted lower alkylacrylamides and -methacrylamides and vinylically unsaturated carboxylic acids having a total of 3 to 5 carbon atoms.

Examples of suitable hydrophilic comonomers (a) include hydroxyethyl methacrylate (HEMA), hydroxyethyl acrylate, hydroxypropyl acrylate, trimethylammonium-2-hydroxypropyl methacrylate hydrochloride (Blemer® QA, for example from Nippon Oil), dimethylaminoethyl methacrylate (DMAEMA), dimethylaminoethyl methacrylamide, acrylamide, methacrylamide, N,N-dimethylacrylamide (DMA), allyl alcohol, vinylpyridine, glycerol methacrylate, N-(1,1-dimethyl-3-oxobutyl)acrylamide, -vinyl-2-pyrrolidone (NVP), acrylic acid, methacrylic acid and the like.

Preferred hydrophilic comonomers (a) are 2-hydroxyethyl methacrylate, dimethylaminoethyl methacrylate, trimethylammonium-2-hydroxypropyl methacrylate hydrochloride, and N-vinyl-2-pyrrolidone.

The polymers according to the invention are built up in a manner known per se from the corresponding monomers and/or macromers according to the invention by a polymerization reaction with which the expert is familiar. Usually, a mixture of the abovementioned monomers is heated, with the addition of an agent which forms free radicals. Such an agent which forms free radicals is, for example, azoisobutyronitrile (AIBN), potassium peroxodisulfate, dibenzoyl peroxide, hydrogen peroxide or sodium percarbonate. If the compounds mentioned are heated, for example, free radicals are then formed, by homolysis, and can then, for example, initiate a polymerization.

Polymerization can be carried out in the presence or absence of a solvent. Suitable solvents are in principle all solvents which dissolve the monomers used, for example water, alcohols, such as lower alkanols, for example ethanol or methanol, and furthermore carboxylic acid amides, such as dimethylformamide, dipolar aprotic solvents, such as dimethyl sulfoxide or methyl ethyl ketone, ketones, for example acetone or cyclohexanone, hydrocarbons, for example toluene, ethers, for example THF, dimethoxyethane or dioxane, and halogenated hydrocarbons, for example trichloroethane, and also mixtures of suitable solvents, for example mixtures of water with an alcohol, for example a water/ethanol or a water/methanol mixture.

If appropriate, a polymer network can be intensified by addition of a so-called crosslinking agent, for example a polyunsaturated comonomer (b). The invention furthermore relates to a polymer comprising the polymerization product of a macromer according to the invention with, if appropriate, at least one vinylic comonomer (a) and with at least one comonomer (b).

Examples of typical comonomers (b) are, for example, allyl(meth)acrylate, lower alkylene glycol di(meth)acrylate, poly lower alkylene glycol di(meth)acrylate, lower alkylene di(meth)acrylate, divinyl ether, divinyl sulfone, di- or trivinylbenzene, trimethylolpropane tri(meth)acrylate, pentaerythritol tetra(meth)acrylate, bisphenol A di(meth) acrylate, methylenebis(meth)acrylamide, triallyl phthalate or diallyl phthalate. The amount of comonomer (b) used is expressed in the weight content with respect to the total polymer and is in the range from 20 to 0.05 %, in particular in the range from 10 to 0.1%, and preferably in the range from 2 to 0.1%.

IV. Organic or Inorganic Pigments

The class of radiation-absorbing additives useful with the present invention are organic or inorganic pigments, or derivatives thereof. Useful pigments include, but are not limited to phthalocyanine blue, phthalocyanine green, titanium (iv) oxide, iron oxide red, iron oxide yellow, chromophtal violet and chromophtal oxide green. The use of organic pigments, particularly phthalocyanine pigments, more particularly copper phthalocyanine pigments, and even more particularly copper phthalocyanine blue pigment (e.g., Color Index Pigment Blue 15, Constitution No. 74160) is preferred.

The amount of pigment necessary in a particular application may vary within wide limits dependent, in part, upon the desired final product dimensions and desired visible and/or ultraviolet light transmission. For example, an amount of pigment is chosen so that the optical transmission of the final molding or lens is, for example, greater than 80%, preferably greater than 90%, more preferably from about 92% to about 99.5%, and most preferably from about 93% to about 97%. The above transmission values refer to a 100 $\mu$m center thickness of the lens and to the wavelength of the absorption maximum of the respective pigment. The amount of pigment necessary to achieve the optical transmission is advantageously chosen so that the weight percentage of pigment, based on the total weight of the polymer precursor, and optional comonomers present in the prepolymerization mixture according to step (c), is from about 0.0001% to about 0.05%. Preferably, the weight percentage of pigment is from about 0.0001% to about 0.02%. More preferably, the weight percentage of pigment is from about 0.0001% to about 0.01%.

The particle size of the pigment may vary within wide limits. In general, the particle size should be small enough to avoid light scattering, which is clinically significant for the degree of tint intensity required. An average or median particle size (as measured by HORIBA LA-910 particle size analyzer) of less than or equal to about 4 $\mu$m, preferably less than or equal to about 0.6 $\mu$m, more preferably from about 0.05 $\Phi$m to about 1 $\mu$m, and even more preferably from about 0.05 $\mu$m to about 0.5 $\mu$m has proven advantageous.

In general, the pigment is provided in a dispersion, which comprises the pigment and at least one dispersing agent. It has also been surprisingly found that the polymer precursor or lens formulation described above promotes dispersion of the pigment particles and may act as a dispersing agent.

V. Dispersing Agents

The pigments outlined above are preferably dispersed in a dispersing agent to form a miscible, liquid colorant dispersion. Typically, pigments do not mix well directly into a lens-forming material. The pigment agglomerates and forms speckles and disrupts the visual performance of the resulting lens. Using a dispersing agent overcomes this problem. The dispersing agent acts to suspend and separate the pigment particles prior to mixing with the lens-forming material.

Examples of suitable dispersing agents include, but are not limited to dimethyl acrylamide (DMA), methyl acrylate, ethyl acrylate, propyl acrylate, isopropyl acrylate, isobutyl acrylate (IBA), isooctyl acrylate (OA), isodecyl acrylate (DA), cyclohexyl acrylate, 2-ethylhexyl acrylate (EHA), methyl methacrylate, ethyl methacrylate, propyl methacrylate, butyl acrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl (meth) acrylate (HFBMA and HFBA), HEMA, TRIS, 3-methacryloxypropylpentamethyldisiloxane and bis (methacryloxypropyl) tetramethyldisiloxane, or a mixture thereof.

Also suitable as a dispersing agent is any monomer comprising alkylenetris(trimethylsiloxy) silane.

The most preferred dispersing agent is TRIS. Since TRIS preferably is already a significant component of the preferred lens material, the pigment separates and is suspended in the lens material better if dispersed into TRIS prior to incorporating into the complete lens-forming material. The dispersing agent may also be the same material as the polymer precursor outlined above.

The pigment amounts of the pigment dispersion employed in this invention may vary within wide limits. In general, a pigment comprises from about 1 to about 70%, by weight, preferably from about 1 to about 30%, by weight, and more preferably from about 4 to about 10%, by weight, based on the weight of the entire dispersion.

The pigment dispersion may be prepared, for example, by simply admixing the pigment and the dispersing agent in a suitable conventional mixing device, preferably in an attritor or a microfluidizer. A stock colorant dispersion solution may be also made by first forming a concentrated dispersion of pigment in a dispersing agent and then adding additional dispersing agent to dilute the concentrated dispersion and create a stock colorant dispersion or solution. In some cases, it may be appropriate to filter or centrifuge the pigment dispersion prior to further processing it in order to exclude pigment particles having a particle size that exceeds the aforementioned preferred sizes.

VI. Photoinitiators

A polymerization reaction (photopolymerization or photocrosslinking) can particularly be carried out using a photoinitiator. Examples of photoinitiators are familiar to the expert, and specifically, suitable photoinitiators include, but are not limited to benzoin methyl ether, 1-hydroxycyclohexylphenyl ketone and DAROCUR and IRGACUR types, preferably DAROCUR 1173® and DAROCUR 2959®, available from Ciba Specialty Chemicals (Tarrytown, N.Y.). Reactive photoinitiators which can be incorporated, for example, into a macromer or can be used as a special comonomer (a) are also suitable. Examples of these are to be found in EP 632 329.

For photopolymerization, a photoinitiator, which can initiate free radical polymerization and/or crosslinking by the use of light, is suitably added. A reasonable amount of mixing is preferred to distribute the photoinitiator substantially uniformly throughout the polymer precursor solution. The amount of photoinitiator can be chosen within wide limits. An amount of up to 0.05 g/g, preferably up to 0.003 g/g, of polymer is preferred.

The photopolymerization can be triggered by actinic radiation, for example light, in particular UV light, of a suitable wavelength. The radiation source may also be gamma or X-radiation. The spectral requirements can be controlled accordingly, if appropriate, by addition of suitable photosensitizers.

VII. Ophthalmically Compatible Surfaces

The ophthalmic lenses of the present invention have a surface which is biocompatible with ocular tissue and ocular fluids during the desired extended period of contact. In one preferred embodiment, the ophthalmic lenses of the present invention include a core material, as defined above, surrounded, at least in part, by a surface which is more hydrophilic and lipophobic than the core material. A hydrophilic surface is desirable in order to enhance the compatibility of the lens with the ocular tissues and tear fluids. As surface hydrophilicity increases, undesirable attraction and adherence of lipids and proteinaceous matter typically decreases. There are factors other than surface hydrophilicity, such as immunological response, which may contribute to deposit accumulation on the lens. Deposition of lipids and proteinaceous matter causes haze on the lens, thereby reducing visual clarity. Proteinaceous deposits may also cause other problems, such as irritation to the eye. After extended periods of continuous or intermittent wear, the lens must be removed from the eye for cleaning, i.e., deposit removal. Therefore, increased surface hydrophilicity, and concomitant reductions in deposits of biological matter, allows increased wear time.

"Surface treatment processes," as used herein, refers to processes to render a surface more ophthalmically compatible, in which, by means of contact with a vapor or liquid, and/or by means of application of an energy source (1) a coating is applied to the surface of an article, (2) chemical species are adsorbed onto the surface of an article, (3) the chemical nature (e.g., electrostatic charge) of chemical groups on the surface of an article are altered, or (4) the surface properties of an article are otherwise modified.

There are a variety of methods disclosed in the art for rendering a surface of a material hydrophilic. For example, the lens may be coated with a layer of a hydrophilic polymeric material. Alternatively, hydrophilic groups may be grafted onto the surface of the lens, thereby producing a monolayer of hydrophilic material. These coating or grafting processes may be effected by a number of processes, including without limitation thereto, exposing the lens to plasma gas or immersing the lens in a monomeric solution under appropriate conditions.

Another set of methods of altering the surface properties of a lens involves treatment prior to polymerization to form the lens. For example, the mold may be treated with a plasma (i.e., an ionized gas), a static electrical charge, irradiation, or other energy source, thereby causing the prepolymerization mixture immediately adjacent the mold surface to differ in composition from the core of the prepolymerization mixture.

A preferred class of surface treatment processes are plasma processes, in which an ionized gas is applied to the surface of an article. Plasma gases and processing conditions are described more fully in U.S. Pat. Nos. 4,312,575 and 4,632,844, which are incorporated herein by reference. The plasma gas is preferably a mixture of lower alkanes and nitrogen, oxygen or an inert gas.

In a preferred embodiment, the lens is plasma treated in the presence of a mixture of (a) a $C_{1-6}$ alkane and (b) a gas selected from the group consisting of nitrogen, argon, oxygen, and mixtures thereof. In a more preferred embodiment, the lens is plasma treated in the presence of a mixture of methane and air.

VIII. Utility

A. Ophthalmic Moldings

All the information outlined above naturally apply not only to contact lenses, but also to other moldings according to this invention. While visibility-tinted ophthalmic lenses are the preferred products, the present invention may have utility in the fabrication of a wide variety of translucent or transparent polymeric products, including without limitation thereto, translucent automotive shields or glazing, films or membranes such as membranes for diffusion control, photostructurizable films for information storage or photoresist materials, and plastic eyeglasses or spectacles. Ophthalmic lenses, as used herein, refers to contact lenses (hard or soft), intraocular lenses and artificial corneas. The present invention has particular utility regarding the fabrication of soft, tinted high Dk contact lenses, which are edge-to-edge tinted so that the user can identify the lenses in a lens containing container.

Examples of other ophthalmic moldings include without limitation thereto, contact lenses for eye color modification, ophthalmic drug delivery devices, ophthalmic wound healing devices, and the like.

The sum of the various advantageous aspects in the production of the moldings of the invention leads to the moldings of the invention being suitable especially as mass-produced articles, for example as contact lenses that are worn for a short period of time and are then replaced by new lenses, or as "extended wear" contact lenses.

B. Contact Lenses

As described above, the present ophthalmic moldings have special utility as contact lenses. Contact lenses having sufficient oxygen and water transmission rates from inner (base curve) to outer (front curve) surface may be continuously worn for longer periods of time without substantial corneal swelling or wearer discomfort. The method of wear includes (a) applying the lens to the eye and (b) allowing the lens to remain in intimate contact with the eye and tear fluids for a period without substantial adverse impact on corneal health or wearer comfort.

A preferred method includes additional steps of (c) removing the lens from the ocular environment; (d) treating the lens (i.e., disinfecting or cleaning the lens); (e) re-applying the lens to the eye; and (f) allowing the lens to remain in intimate contact with the eye and tear fluids for a period without substantial adverse impact on corneal health or wearer comfort.

A specific embodiment of the invention is directed to contact lenses comprising a novel, visibly tinted polymer matrix. Such contact lenses have a range of unusual and extremely advantageous properties. Amongst these properties are, for example, their excellent compatibility with the human cornea (if necessary after suitable surface treatment (coating)) and with tear fluid, which is based on a balanced ratio between water content and water permeability, oxygen permeability and mechanical and adsorptive properties. This balance of desirable properties results in high comfort and the absence of irritation and allergenic effects. Owing to their favorable permeability properties with respect to various salts, nutrients, water and diverse other components of tear fluid and gases ($CO_2$ and $O_2$), the novel contact lenses have no effect, or virtually no effect, on the natural metabolic processes in the cornea. In contrast to many other siloxane-containing contact lenses, the present lenses have chemical and mechanical properties and ion permeability sufficient to avoid the undesired binding effect. Furthermore, the novel contact lenses have high dimensional stability and shelf life.

The high oxygen permeability is required to prevent corneal swelling, thereby reducing the likelihood of ocular damage and wearer discomfort during periods of extended wear. High ion permeability enables a lens to move on the eye such that corneal health is not substantially altered and wearer comfort is acceptable during a period of extended, continuous contact with ocular tissue and ocular fluids, if necessary.

Tinting a lens enables the user to easily locate a lens in a clear solution within a lens storage, disinfecting or cleaning container. Generally, the tinted lenses of this invention are uniformly tinted throughout the body of the lens. Moreover, the lenses are bleach resistant, and due to a quantitative incorporation of the pigment into the lens matrix, show no leaching or migration of the pigment out of the lens. In addition, the tinted contact lenses are optically clear and transparent and have transmission values % T that are equivalent to untinted lenses.

The edge-to-edge tinted contact lenses of this invention can be produced in a very simple and efficient manner as compared with the prior art. This is the result of several factors. First, the starting materials are inexpensive and easy to obtain or prepare. Second, the prepolymers are surprisingly stable. Accordingly, since it is possible to use a stable prepolymer, and further since the pigment is entrapped quantitatively within the resulting polymer matrix during the cross-linking or polymerization step, virtually no subsequent purification, such as, especially the complex extraction of pigment and/or unpolymerized components is required (e.g., to meet ophthalmic and regulatory requirements). A further significant advantage of the present methods and compositions is that the pigment does not deactivate during the cross-linking or polymerization step. It has been unexpectedly found that pigments, particularly metal (e.g., copper) phthalocyanine pigments and equivalents thereof, are not subject to any substantial tinting deactivation during the application of UV radiation to form the contact lens. In contrast, quite a large number of dyes are subject to bleaching during the polymerization or molding step of the lens making process.

Lastly, the preferred contact lenses of the present invention are those which are comfortable over the period of wear. If the lens diameter is too small, the eyelids will not cover any portion of the lens when the eye is open. Thus, the eyelids will contact the edge of the lens each time the eyelid is closed. This repeated eyelid-lens interaction typically causes irritation, wearer discomfort, and lens dislodgement. Accordingly, the preferred contact lens diameters are those which are sufficiently large to minimize eyelid-lens interaction and the associated irritation. Preferably, the contact lens has a diameter of about 12 to about 16 mm, more preferably about 13 to 15 mm, and most preferably about 13.5 to 14.8 mm.

IX. Methods of Manufacture

The tinted, high Dk ophthalmic molding or lens of this invention may be manufactured, generally, by thoroughly mixing the polymerizable materials including the polymer precursor (and any comonomers) and the pigment dispersion, applying an appropriate amount of the mixture to a lens mold cavity, and initiating polymerization. Photoinitiators, such as those commercially available photoinitiators disclosed above, may be added to the prepolymerization mixture (polymer precursor and pigment dispersion) to aid in initiating polymerization. Polymerization may be initiated by a number of well known techniques, which, depending on the polymerizable material, may include application of radiation such as microwave, thermal, e-beam and ultraviolet. A preferred method of initiating polymerization is by application of ultraviolet radiation. For the introduction of the prepolymerization mixture into a mold, processes known per se can be used, such as, especially, conventional metering in, for example, by means of dropwise introduction.

Appropriate molds or mold halves may be manufactured from disposable or recyclable polymeric materials (e.g., polypropylene or polystyrene) which transmit radiation of the chosen wavelength sufficient to cross-link or polymerize the polymer precursor. Alternatively, reusable molds may be manufactured from materials such as quartz, sapphire or metals.

When the moldings to be produced are contact lenses, they can be produced in a manner known per se, for example, in a conventional "spin-casting" mold, as described, for example in U.S. Pat. No. 3,408,429. However, double-sided molding (DSM) processes, such as described in U.S. Pat. No. 4,347,198, which is incorporated by reference, are preferred. Double-sided molding processes typically utilize a concave (also known as a "female" or "front surface") mold half which mates with a convex (also known as a "male" or "back surface") mold half. Typically, in the DSM process, liquid monomer or polymer precursor mixture is dispensed into the female mold half, the male mold half is affixed to the female mold half, and light (e.g., UV) is applied to initiate polymerization or cross-linking and form a solid lens.

It is to be emphasized that, according to the invention, the polymerization or cross-linking can be effected in a very short time, for example, in less than 60 minutes, preferably less than 20 minutes, more preferably less than 5 minutes and most preferably in less than 30 seconds. Opening the mold to remove the resulting molding can be carried out in a manner known per se.

It has been discovered that the ion and/or water permeability of some of the aforementioned core materials may be increased by initiating and completing polymerization in an atmosphere which is substantially free of oxygen. Suitable gases which are readily commercially available include, without limitation thereto, nitrogen and carbon dioxide. Thus, in a preferred embodiment, the oxyperm and ionoperm polymerizable materials are polymerized in an atmosphere having less than about 10000 ppm oxygen. More preferably, the atmosphere surrounding the polymerizable material contains less than about 1000 ppm oxygen. Even more preferably, the surrounding atmosphere contains less than about 100 ppm oxygen, while the most preferred oxygen content is less than about 20 ppm.

In the aforementioned embodiment, the prepolymer mixture must be degassed prior to polymerization. The degassing may be accomplished by a number of techniques known in the art. One technique for degassing the prepolymer mixture involves the use of a series of freezing and thawing steps which are repeated until the appropriate gas concentration level is achieved in the prepolymer mixture. This freeze/thaw method involves cooling the prepolymer mixture until the mixture solidifies, applying a vacuum to the solidified prepolymer mixture, discontinuing the vacuum, and thawing the prepolymer mixture until the mixture is again in liquid form. While this degassing technique is advantageous in a laboratory setting, other degassing techniques known in the art may be more advantageous for commercial lens manufacturing processes.

Alternatively, the atmosphere surrounding the lens mold may include oxygen, under certain conditions. For example, if the lens mold halves seal adequately to one another and the lens mold material has a low rate of oxygen permeability (e.g., polypropylene), it is possible to polymerize a degassed prepolymer mixture in a mold surrounded by ambient air without reaching prepolymer oxygen concentrations sufficiently high to substantially reduce ion or water permeability of the final lens. Thus, in another preferred embodiment of double-sided molding, the lens is formed by the following steps: (1) the prepolymer mixture is degassed, (2) a lens mold half is filled with the prepolymer mixture, (3) the mold halves are sealed to one another, and (4) the polymerization is initiated to form the lens, where the lens mold halves are formed from a material having a low oxygen permeability and steps (2)–(4) may occur in the presence or absence of oxygen. In this embodiment, it is preferred that the lens molds are stored in an inert substantially oxygen-free atmosphere, e.g., nitrogen or carbon dioxide, prior to use.

When the molding produced according to this invention is a contact lens and when the latter has been produced from a prepolymerization mixture comprising purified components, then the polymerized or cross-linked product does not contain troublesome impurities. Subsequent extraction is therefore unnecessary.

X. EXAMPLES

The previous disclosure will enable one having ordinary skill in the art to practice the invention. In order to better enable the reader to understand specific embodiments and the advantages thereof, reference to the following examples is suggested. However, the following examples should not be read to limit the scope of the invention in any way. Of the following, Examples 1A–1D are arranged in accordance with the materials disclosed and described in U.S. Pat. No. 5,760,100 issued to Nicolson et al., which is herein incorporated by reference in its entirety.

Thus, Examples 1A(i) and 1A(ii) relate to Material "A" as that disclosed and described in U.S. Pat. No. 5,760,100 issued to Nicolson et al. Example 1B relates to Material "B" as that disclosed and described in U.S. Pat. No. 5,760,100 issued to Nicolson et al. Example 1C relates to Material "C" as that disclosed and described in U.S. Pat. No. 5,760,100 issued to Nicolson et al. Example 1D relates to Material "D" as that disclosed and described in U.S. Pat. No. 5,760,100 issued to Nicolson et al. The remaining Examples are not specifically disclosed and described in U.S. Pat. No. 5,760,100 issued to Nicolson et al. For all the following Examples, temperatures are stated in degrees Celsius (EC), unless otherwise specified.

Example 1A(i)

A polysiloxane macromer is prepared by reacting, at room temperature (about 21° C.), one mole equivalent (about 100 grams) of poly(dimethylsiloxane) dialkanol (Shin Etsu Chemical Co., Tokyo, Japan) having hydroxyethyl propoxy end groups with 2 mole equivalents (about 21.2 grams) of isophorone diisocyanate (Aldrich Chemical Co., Milwaukee, Wis.) in the presence of about 0.2 grams dibutyltin dilaurate catalyst (Pfaltz & Bauer, Inc., Waterbury, Conn.). After about 48 hours reaction time, 2.02 mole equivalents (about 38.7 grams) of poly(ethylene glycol) ("PEG", about 610 g/mol Mn, Dow Chemical Corp., Midland, Mich.) and about 0.17 grams of dibutyltin dilaurate (about 0.43% by weight PEG) are added to 80 grams of the reaction product from the prior step. Sufficient chloroform (Aldrich Chemical Co.) is added to the mixture to make the mixture homogeneous. This mixture is stirred at room temperature for about 15 hours. Next, the mixture is stirred for about 8 hours at a temperature of about 44 to 48° C., with the temperature held substantially constant by a surrounding oil bath. The chloroform is then evaporated, in order to achieve a final concentration of about 50% by weight solids, by stirring the mixture at room temperature for about 8 hours. Then, about 2.14 mole equivalents (about 10.4 grams) of isocyanatoethyl methacrylate ("IEM", Monomer Polymer, Inc., Feasterville, Pa.) is added to the mixture. Finally, the mixture is covered with aluminum foil and stirred at room temperature for about 17 hours, yielding a polysiloxane-containing macromer having a number-average molecular weight (Mn) of about 4000 grams per mole.

Example 1A(ii)

A polysiloxane macromer is prepared substantially in accordance with the procedure described in Example 1A(i).

A copolymer precursor solution is prepared by mixing about 180 grams polysiloxane-containing macromer, about 15 grams 3-methacryloxypropyltris (trimethylsiloxy) silane (Shin Etsu), about 4 grams 2-hydroxyethyl methacrylate ("HEMA", about one gram ethylene glycol dimethacrylate ("EDGMA", and about one gram DAROCUR® 1173 photoinitiator at room temperature for about 16 hours. The copolymer precursor solution is then polymerized to form contact lenses. Polypropylene contact lens molds are filled with the copolymer precursor solution. Ultraviolet light (about 300 to 400 nm) at about 3–6 mW/cm$^2$ is applied to the solution in the mold for about 3 hours at room temperature. The UV light causes polymerization, thereby allowing the solution to form contact lens having the shape of the mold. The lens are extracted with isopropanol to remove remaining chloroform solvent and any unreacted components. A preferred resulting polymer contains about 81.8 weight percent polysiloxane macromer, about 13.6% TRIS, about 3.6% 2-hydroxyethyl methacrylate, and about 0.9% EDGMA.

Example 1B 51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a water bath. After stirring overnight at room temperature, the reaction is complete. Isocyanate titration gives an NCO content of 1.40 meq/g (theory: 1.35 meq/g). 202. of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g). 13.78 g (88.9 mmol) of 2-isocyanatoethyl methacrylate (IEM) are added under argon to 247 g of the α,ω-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colorless and clear. It can be stored in air at room temperature for several months in the absence of light without any change in molecular weight.

Example 1C

Reaction of α,ω-bis-aminopropyl-dimethylpolysiloxane with D(+)gluconic acid d-lactone: Before the reaction, the amino-functionalized polydimethylsiloxane employed for the synthesis (X-22-161-C, Shin Etsu, JP) was finely dispersed in acetonitrile, extracted and then subjected to molecular distillation.

The following reactions take place with exclusion of $H_2$ 0.200 g of purified amino-functionalized polydimethylsiloxane (0.375 meq of $NH_2$/g; Mn(VPO) 3400–3900 (VPO, Vapour Pressure Osmometry)), dissolved in 200 ml of absolute THF, are slowly added dropwise to a suspension of 13.35 g (75 mmol) of D(+)gluconic acid d-lactone in 50 ml of absolute THF and the mixture is stirred at 40° C. for about 24 hours until the lactone has reacted completely. (Monitoring of the reaction by thin layer chromatography (TLC): silica gel; i-propanol/H2O ethyl acetate 6:3:1; staining with Ce(IV) sulfate/phosphoromolybdic acid solution (CPS reagent)). After the reaction, the reaction solution is concentrated to dryness and the residue is dried under 3 Pa (0.03 mbar) for 48 hours. 213.3 g of α,ω-bis(3-gluconamidopropyl)-poly-dimethylsiloxane are obtained. Titration of the amino groups with perchloric acid shows a conversion of the amino groups of more than 99.8%.

Example 1D

In a dry box under nitrogen atmosphere, about 200 grams of dry PDMS dipropoxyethanol (Shin-Etsu) is added to a container. Isocyanatoethyl methacrylate (IEM) in an amount equal to about 2 moles per mole PDMS dialkanol is added to the container. About 0.1 weight percent dibutyltin dilaurate (DBTL) catalyst, based on PDMS dialkanol weight, is added to the container along with a stir bar. The container is immersed in an oil bath atop a stir plate, and secured in place with a clamp. A stream of UPC air at about 2 psig is passed over the mixture. The mixture is agitated at room temperature (about 22° C.) for about 24 hours. An iterative procedure follows in which the mixture is analyzed for isocyanate content and IEM is added if the PDMS dialkoxyalkanol has not been completely reacted. The mixture is stirred about 24 hours more. The macromer produced is a siloxane-containing macromer.

Example 2
(Preparation of a Pigment Dispersion)

The following example illustrates the preparation of a dispersion of a blue pigment, copper phthalocyanine, in a organosiloxane monomer, Shin-Etsu KF2801, or TRIS, according to an embodiment of this invention. This dispersion is used in contact lens formulations. Since these products are FDA approved and controlled, the dispersion must be prepared with thoroughly cleaned equipment according to GMP methods and conditions.

500 g of a suspension of 5% copper phthalocyanine (CuP) is dispersed in TRIS. A dispersion is prepared using the M-110EH microfluidizer equipped with an H30Z (#6366)/G10Z (#6107) chamber set. The process time is 60 minutes, the process pressure is 25,000 psi. The process temperature is kept at # 30EC. A mechanical stirrer is set up so that the recirculating dispersion can be stirred in the liquid reservoir throughout the dispersion process.

The microfluidizer is first flushed with ethanol, then thoroughly primed with pure TRIS prior to the process. A 5% suspension of CuP/TRIS is poured into the reservoir and stirred. Flow through the M-110EH is started. Recirculation of the dispersion into the reservoir is started only after several ml of blue dispersion is expelled from the exit line. After one hour of recirculation, the machine is stopped, and all of the dispersion is collected from the sample reservoir. The void volume remaining in the machine is discarded, as one flushes the machine with pure TRIS, then ethanol, to rinse and clean the machine.

A mean particle size of approximately –0.35 μm, with >80% of the particles smaller than 0.45 μm, and all the particles <2 μm in size is achieved. The yield of dispersion is approximately 80%. Particle size is analyzed on a HORIBA LA-910 or 920, using ethanol as the solvent, with sonication for 3 minutes prior to measurement. Preferably, particle-size is measured before and after sonication.

Example 3
(Preparation of a Tinted Prepolymerization Mixture)

Using 100% of a lens formulation of the present invention, the component % s (converted to grams (g)) are as follows:

| | | |
|---|---|---|
| 24.95% ethanol | = | 24.95 g |
| 28.88% DMA | = | 28.88 g |
| 19.25% TRIS | = | 19.25 g |
| 25.92% Macromer | = | 25.92 g |
| 1.00% DAROCUR | = | 1.00 g |
| 100.00% | = | 100.00 g |

The final lens formulation preferably has 50 ppm copper phthalocyanine (CuP) to achieve a preferred tint. The final formulation contains 19.25% TRIS. To calculate the desired 50 ppm in the final lens formulation, divide 50 ppm by 0.1925, which equals 259.74 ppm, or –260 ppm. This means that for every 19.25 g of blue-tinted TRIS (TRIS-blue) that you add to the lens formulation, it should contain 260 ppm copper phthalocyanine.

260 ppm of blue-tinted TRIS for a lens material may be made by adding the 5% stock solution of the TRIS-blue to clear TRIS. 5% means 0.05 g copper phthalocyanine per g of TRIS-blue. Take 1.000000 g as 1 million parts (adding enough zeros to represent 1,000,000). Then a 5% solution means there are 0.050000 g of copper phthalocyanine per gram of stock TRIS-blue solution, or 50,000 ppm. 50,000 ppm TRIS-blue stock is diluted to get 260 ppm blue tinted TRIS for the formulation.

Throughout this application, various publications are referenced. The disclosures of these publications in their entireties are hereby incorporated by reference into this application in order to more fully describe the state of the art to which this invention pertains.

The invention has been clearly described in detail, with particular reference to certain preferred embodiments, in order to enable the reader to practice the invention without undue experimentation. Theories of operation have been offered to better enable the reader to understand the invention, but such theories do not limit the scope of the invention. In addition, a person having ordinary skill in the art will readily recognize that many of the previous components, compositions, and parameters may be varied or modified to a reasonable extent without departing from the scope and spirit of the invention.

Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A soft, tinted ophthalmic molding having an oxygen transmissibility (Dk/t) of at least 60 barrers/mm and comprising:
   (i) a polymer matrix which is a polymerization product of a prepolymerization mixture having about 60 to 85 weight percent of oxyperm polymerizable material and about 15 to 40 weight percent of ionoperm polymerizable material; and incorporated therein
   (ii) particles of a pigment.

2. The soft, tinted ophthalmic molding of claim 1, wherein the polymer matrix is a core material and is at least in part surrounded by an ophthalmically compatible surface obtained by a surface treatment process.

3. The soft, tinted ophthalmic molding of claim 1, wherein the ophthalmic molding is selected from the group consisting of a contact lens for vision correction, a contact lens for eye color modification, an ophthalmic drug delivery device and an ophthalmic wound healing device.

4. The soft, tinted ophthalmic molding of claim 1, wherein the ophthalmic molding is a vision correction contact lens.

5. The soft, tinted ophthalmic molding of claim 1, wherein the oxyperm polymerizable material comprises polysiloxane-containing macromer and containing monomer.

6. The soft, tinted ophthalmic molding of claim 1, wherein the pigment comprises an organic pigment, an inorganic pigment, or a mixture thereof.

7. The soft, tinted ophthalmic molding of claim 1, wherein the pigment is a phthalocyanine pigment.

8. The soft, tinted ophthalmic molding of claim 7, wherein the pigment is copper phthalocyanine blue.

9. A method for making a soft, tinted ophthalmic molding comprising:
   (a) providing a polymer precursor capable of forming a polymer or copolymer having high oxygen permeability, wherein the polymer precursor comprises about 60 to 85 weight percent of oxyperm polymerizable material and about 15 to 40 weight percent of ionoperm polymerizable material;
   (b) providing a pigment dispersion comprising particles of a pigment and a dispersing agent;
   (c) mixing the pigment dispersion and the polymer precursor to form a tinted prepolymer mixture;
   (d) dispensing the tinted prepolymer mixture into a mold; and
   (e) cross-linking or polymerizing the tinted prepolymer mixture in the mold to form a soft, tinted ophthalmic molding having an oxygen transmissibility (Dk/t) of at least 60 barrers/mm and comprising a polymer matrix and the particles of the pigment entrapped therein.

10. The method of claim 9, wherein the soft, tinted ophthalmic molding is a vision correction contact lens.

11. The method of claim 9, wherein the polymer precursor is a liquid material.

12. The method of claim 9, wherein the oxyperm polymerizable material comprises a silicone-containing macromer or monomer, a fluorine-containing macromer or monomer, or a mixture thereof.

13. The method of claim 9, wherein the oxyperm polymerizable material comprises a siloxane-containing macromer having a dialkyl siloxane group.

14. The method of claim 9, wherein the pigment dispersion is miscible with the polymer precursor.

15. The method of claim 9, wherein the pigment comprises an organic pigment, an inorganic pigment, or a mixture thereof.

16. The method of claim 9, wherein the pigment is a phthalocyanine pigment.

17. The method of claim 9, wherein the dispersing agent is same material as the polymer precursor of step (a).

18. The method of claim 9, wherein the dispersing agent is an acrylated or methacrylated siloxane monomer.

19. The method of claim 9, wherein the dispersing agent is any monomer comprising alkylenetris(trimethylsiloxy) silane.

20. The method of claim 9, wherein the dispersing agent is selected from the group consisting of methyl methacrylate, isobutyl acrylate, isooctyl acrylate, isodecyl acrylate, 2-ethylhexyl acrylate, hexafluorobutyl (meth) acrylate, HEMA, TRIS, acrylonitrile, and mixtures thereof.

21. The method of claim 9, wherein the weight percentage of the particles of the pigment, based on the total weight of the prepolymer mixture, is from greater than zero to about 0.05 weight percent.

22. The method of claim 9, wherein step (e) occurs in less than about 5 minutes.

23. A soft, tinted ophthalmic molding made by the method of claim 9.

24. A soft, tinted ophthalmic lens having an oxygen transmissibility (Dk/t) of at least 60 barrers/mm and comprising the reaction product of:
   (i) a prepolymerization mixture having about 60 to 85 weight percent of oxyperm polymerizable material and about 15 to 40 weight percent of ionoperm polymerizable material, wherein the oxyperm polymerizable material includes a siloxane-containing macromer; and
   (ii) a pigment dispersion comprising particles of a pigment and a dispersing agent.

25. The soft, tinted ophthalmic lens of claim 24, wherein the dispersing agent is cross-linkable or polymerizable with component (i).

26. The soft, tinted ophthalmic lens of claim 24, wherein the siloxane-containing macromer has a dialkyl siloxane group.

27. The soft, tinted ophthalmic lens of claim 24, wherein the dispersing agent is selected from the group consisting of methyl methacrylate, isobutyl acrylate, isooctyl acrylate, isodecyl acrylate, 2-ethylhexyl acrylate, hexafluorobutyl (meth)acrylate, HEMA, TRIS and acrylonitrile, or a mixture thereof.

28. The soft, tinted ophthalmic lens of claim 26, wherein the dispersing agent is TRIS.

29. A composition for making a soft, tinted ophthalmic lens comprising:
   (i) about 60 to 85 weight percent of an oxyperm polymerizable material including a siloxane-containing macromer; and
   (ii) about 15 to 40 weight percent of ionoperm polymerizable material: and
   (iii) a pigment dispersion comprising particles of a pigment and a dispersing agent which is a monomer comprising alkylenetris(trimethylsiloxy) silane.

30. The composition of claim 29, wherein the dispersing agent is TRIS.

* * * * *